United States Patent
Li et al.

(10) Patent No.: US 11,693,214 B2
(45) Date of Patent: Jul. 4, 2023

(54) IMAGING LENS ASSEMBLY

(71) Applicant: Zhejiang Sunny Optical Co., Ltd, Ningbo (CN)

(72) Inventors: Ming Li, Ningbo (CN); Jianke Wenren, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 275 days.

(21) Appl. No.: 16/273,447

(22) Filed: Feb. 12, 2019

(65) Prior Publication Data

US 2019/0170983 A1    Jun. 6, 2019

Related U.S. Application Data

(63) Continuation of application No. PCT/CN2018/084210, filed on Apr. 24, 2018.

(30) Foreign Application Priority Data

Sep. 18, 2017  (CN) .......................... 201710838882.2
Sep. 18, 2017  (CN) .......................... 201721190577.9

(51) Int. Cl.
*G02B 13/00*  (2006.01)
*G02B 9/62*    (2006.01)
(Continued)

(52) U.S. Cl.
CPC .......... *G02B 13/0045* (2013.01); *G02B 3/04* (2013.01); *G02B 7/028* (2013.01); *G02B 9/62* (2013.01);
(Continued)

(58) Field of Classification Search
CPC . G02B 3/04; G02B 7/028; G02B 9/62; G02B 13/0055; G02B 13/18; G02B 13/0045; G02B 13/00
See application file for complete search history.

(56) References Cited

U.S. PATENT DOCUMENTS 5,699,202 A * 12/1997 Yamamoto ............... G02B 9/04
                                                                359/754
9,348,117 B1 * 5/2016 Chang .................. G02B 27/646
(Continued)

FOREIGN PATENT DOCUMENTS

CN    101710207 A    5/2010
CN    102540407 A    7/2012
(Continued)

*Primary Examiner* — Stephone B Allen
*Assistant Examiner* — Gabriel A Sanz
(74) *Attorney, Agent, or Firm* — Hauptman Ham, LLP (57) ABSTRACT

The present disclosure discloses an imaging lens assembly. The imaging lens assembly includes, sequentially from an object side to an image side of the imaging lens assembly, a first lens having a positive refractive power and a convex object-side surface; a second lens having a negative refractive power and a concave image-side surface; and at least one subsequent lens. At least one of the first lens, the second lens, or the at least one subsequent lens is a glass aspheric lens. A transmittance T1 of the imaging lens assembly corresponding to a wave band 650 nm satisfies: T1>85%, a transmittance T2 of the imaging lens assembly corresponding to a wave band 490 nm satisfies: T2>88%, and a transmittance T3 of the imaging lens assembly corresponding to a wave band 430 nm satisfies: T3>75%.

13 Claims, 6 Drawing Sheets (51) Int. Cl.
*G02B 3/04* (2006.01)
*G02B 13/18* (2006.01)
*G02B 7/02* (2021.01)

(52) U.S. Cl.
CPC ......... *G02B 13/0055* (2013.01); *G02B 13/18* (2013.01)

(56) References Cited

U.S. PATENT DOCUMENTS

| | | |
|---|---|---|
| 2003/0193722 A1 | 10/2003 | Mihara |
| 2012/0194925 A1 | 8/2012 | Teraoka |
| 2016/0069744 A1* | 3/2016 | Bayya ...................... G02B 1/02 250/339.01 |
| 2016/0109689 A1 | 4/2016 | Shin et al. |
| 2016/0195702 A1* | 7/2016 | Lee ........................ G02B 9/62 359/713 |
| 2016/0304390 A1* | 10/2016 | Mikami .................... C03C 4/02 |
| 2017/0329108 A1* | 11/2017 | Hashimoto ........ G02B 13/0045 |
| 2018/0203208 A1* | 7/2018 | Hsueh ..................... G02B 3/04 |

FOREIGN PATENT DOCUMENTS

| | | |
|---|---|---|
| CN | 103217780 A | 7/2013 |
| CN | 103543518 A | 1/2014 |
| CN | 203909382 | 10/2014 |
| CN | 105242374 A | 1/2016 |
| CN | 106199906 A | 12/2016 |
| CN | 107390350 A | 11/2017 |
| CN | 207123649 U | 3/2018 |

\* cited by examiner

IMAGING LENS ASSEMBLY

CROSS-REFERENCE TO RELATED APPLICATIONS

This is a continuation of International Application PCT/CN2018/084210, with an international filing date of Apr. 24, 2018, which claims the priorities and rights to Chinese Patent Application No. 201710838882.2 and Chinese Patent Application No. 201721190577.9, filed with the China National Intellectual Property Administration (CNIPA) on Sep. 18, 2017, the disclosures of which are hereby incorporated by reference in their entirety.

TECHNICAL FIELD

The present disclosure relates to an imaging lens assembly, and specifically to a glass aspheric imaging lens assembly.

BACKGROUND

At present, the photosensitive elements commonly used in an optical system are CCD (charge-coupled device) and CMOS (complementary metal-oxide semiconductor) elements. With the improvement in performance and reduction in size of the commonly used photosensitive elements, corresponding requirements on high imaging quality and miniaturization of the counterpart camera lens assemblies have been brought forward. At the same time, the requirements of consumers on the imaging quality of portable electronic products become higher and higher, and the electronic products such as cell phones and tablet computers become thinner and smaller, which also require the miniaturized camera lens assemblies having the high imaging quality.

Therefore, the present disclosure is aimed to provide a miniaturized imaging lens assembly having an improved imaging quality.

SUMMARY

In order to solve at least some of the problems in the existing technology, the present disclosure provides an imaging lens assembly.

According to an aspect, the present disclosure provides an imaging lens assembly. The imaging lens assembly includes, sequentially from an object side to an image side of the imaging lens assembly, a first lens having a positive refractive power and a convex object-side surface; a second lens having a negative refractive power and a concave image-side surface; and at least one subsequent lens. At least one of the first lens, the second lens, or the at least one subsequent lens is a glass aspheric lens. A transmittance T1 of the imaging lens assembly corresponding to a wave band 650 nm satisfies: T1>85%, a transmittance T2 of the imaging lens assembly corresponding to a wave band 490 nm satisfies: T2>88%, and a transmittance T3 of the imaging lens assembly corresponding to a wave band 430 nm satisfies: T3>75%.

According to an implementation of the present disclosure, an influence ratio dng/dt of a unit temperature to a unit refractive index of the glass aspheric lens and a influence ratio dni/dt of a unit temperature to a unit refractive index of a lens closest to the image side satisfy: |dng/dt|/|dni/dt|<0.1.

According to an implementation of the present disclosure, an abbe number Vg of the glass aspheric lens and an abbe number Vi of the lens closest to the image side satisfy: $0.35<Vg/Vi<1.5$.

According to an implementation of the present disclosure, a refractive index Ng of the glass aspheric lens satisfies: $1.5 \leq Ng \leq 2.0$.

According to an implementation of the present disclosure, an effective focal length f of the imaging lens assembly and an entrance pupil diameter EPD of the imaging lens assembly satisfy: $1.5<f/EPD<2.5$.

According to an implementation of the present disclosure, the effective focal length f of the imaging lens assembly and an effective focal length fg of the glass aspheric lens satisfy: $-0.6<f/fg<1.2$.

According to an implementation of the present disclosure, the effective focal length f of the imaging lens assembly and a radius of curvature R1 of the object-side surface of the first lens satisfy: $2<f/R1<4$.

According to an implementation of the present disclosure, the radius of curvature R1 of the object-side surface of the first lens and a radius of curvature R4 of the image-side surface of the second lens satisfy: $0<R1/R4<1.0$.

According to another aspect, the present disclosure provides an imaging lens assembly. The imaging lens assembly includes, sequentially from an object side to an image side of the imaging lens assembly, a first lens; a second lens; and at least one subsequent lens. At least one of the first lens, the second lens, or the at least one subsequent lens is a glass aspheric lens. An influence ratio dng/dt of a unit temperature to a unit refractive index of the glass aspheric lens and an influence ratio dni/dt of a unit temperature to a unit refractive index of a lens closest to the image side satisfy: |dng/dt|/|dni/dt|<0.1.

According to an implementation of the present disclosure, the first lens has a positive refractive power, an object-side surface of the first lens is a convex surface, the second lens has a negative refractive power, and an image-side surface of the second lens is a concave surface.

According to another aspect, the present disclosure provides an imaging lens assembly. The imaging lens assembly includes, sequentially from an object side to an image side of the imaging lens assembly, a first lens having a positive refractive power and a convex object-side surface; a second lens having a negative refractive power and a concave image-side surface; and at least one subsequent lens. At least one of the first lens, the second lens, or the at least one subsequent lens is a glass aspheric lens. An effective focal length f of the imaging lens assembly and a radius of curvature R1 of the object-side surface of the first lens satisfy: $2<f/R1<4$.

According to an implementation of the present disclosure, the at least one subsequent lens includes, sequentially along an optical axis from the second lens to the image side, a third lens, a fourth lens, and a fifth lens. The third lens may have a positive refractive power, the fourth lens may have a negative refractive power, and the fifth lens may have a negative refractive power.

According to an implementation of the present disclosure, the at least one subsequent lens includes, sequentially along an optical axis from the second lens to the image side, a third lens, a fourth lens, a fifth lens, and a sixth lens. The third lens may have a positive refractive power or a negative refractive power, and the fourth lens may have a positive refractive power or a negative refractive power. The fifth lens may have a positive refractive power or a negative refractive power, and the sixth lens may have a positive refractive power or a negative refractive power.

According to an implementation of the present disclosure, an abbe number Vg of the glass aspheric lens and an abbe number Vi of a lens closest to the image side satisfy: $0.35<Vg/Vi<1.5$.

According to an implementation of the present disclosure, a refractive index Ng of the glass aspheric lens satisfies: $1.5<Ng\leq2.0$.

According to an implementation of the present disclosure, the effective focal length f of the imaging lens assembly and an entrance pupil diameter EPD of the imaging lens assembly satisfy: $1.5<f/EPD<2.5$.

According to an implementation of the present disclosure, the effective focal length f of the imaging lens assembly and an effective focal length fg of the glass aspheric lens satisfy: $-0.6<f/fg<1.2$.

According to an implementation of the present disclosure, the radius of curvature R1 of the object-side surface of the first lens and a radius of curvature R4 of the image-side surface of the second lens satisfy: $0<R1/R4<1.0$.

The imaging lens assembly according to the present disclosure includes at least one glass aspheric lens, so that the imaging lens assembly has higher image brightness, a higher permeability and a higher color reproduction performance, and thus the performance of the imaging lens assembly can be greatly improved.

BRIEF DESCRIPTION OF THE DRAWINGS

By describing non-limiting implementations below in detail and in combination with the accompanying drawings, other features, objectives and advantages of the present disclosure will be more apparent. In the accompanying drawings.

DETAILED DESCRIPTION OF EMBODIMENTS

The present disclosure will be further described below in detail in combination with the accompanying drawings and the embodiments. It could be appreciated that the specific embodiments described herein are merely used for explaining the relevant invention, rather than limiting the invention. In addition, it should be noted that, for the ease of description, only the parts related to the relevant invention are shown in the accompanying drawings.

It should be understood that in the present disclosure, when an element or a layer is referred to as being "on," "connected to" or "coupled to" another element or layer, it may be directly on, connected or coupled to another element or layer, or an intervening element or layer may be present. When an element is referred to as being "directly on," "directly connected to" or "directly coupled to" another element or layer, there are no intervening elements or layers present. The same reference numerals designate the same elements throughout this specification. As used herein, the term "and/or" includes any and all combinations of one or more of the associated listed items.

It should be understood that, although terms such as "first" and "second" may be used herein to describe various elements, components, areas, layers and/or sections, these elements, components, areas, layers and/or sections should not be limited by these terms. These terms are used to distinguish one element, component, area, layer or section from another element, component, area, layer or section. Thus, a first element, component, area, layer or section discussed below could be termed a second element, component, area, layer or section without departing from the teachings of the present disclosure.

The terminology used herein is for the purpose of describing specific implementations only and is not intended to limit the present disclosure. As used herein, the singular forms "a," "an" and "the" are intended to include the plural forms as well, unless the context clearly indicates otherwise. It should be further understood that the terms "comprising," "including," "having" and variants thereof, when used in this specification, specify the presence of stated features, entireties, steps, operations, elements and/or components, but do not preclude the presence or addition of one or more other features, entireties, steps, operations, elements, components and/or groups thereof. As used herein, the term "and/or" includes any and all combinations of one or more of the associated listed items. Expressions such as "at least one of," when preceding a list of elements, modify the entire list of elements rather than an individual element in the list. Further, the use of "may," when describing implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The present disclosure provides an imaging lens assembly. The imaging lens assembly according to the present disclosure is provided with, sequentially from an object side to an image side of the imaging lens assembly, a first lens having a positive refractive power, a second lens having a negative refractive power, and at least one subsequent lens. In embodiments of the present disclosure, an object-side surface of the first lens is a convex surface, and an image-side surface of the second lens is a concave surface. In the embodiments of the present disclosure, at least one of the first lens, the second lens, or the at least one subsequent lens is a glass aspheric lens.

In an implementation, the at least one subsequent lens includes, sequentially from the second lens to the image side along an optical axis, a third lens, a fourth lens, and a fifth lens. The third lens may have a positive refractive power, the fourth lens may have a negative refractive power, and the fifth lens may have a negative refractive power.

In an implementation, the at least one subsequent lens includes, sequentially from the second lens to the image side along an optical axis, a third lens, a fourth lens, a fifth lens, and a sixth lens. The third lens may have a positive refractive power or a negative refractive power, and the fourth lens may have a positive refractive power or a negative refractive power. The fifth lens may have a positive refractive power or a negative refractive power, and the sixth lens may have a positive refractive power or a negative refractive power.

In the embodiments of the present disclosure, a transmittance T1 of the imaging lens assembly corresponding to a wave band of 650 nm satisfies: T1>85%. A transmittance T2 of the imaging lens assembly corresponding to a wave band of 490 nm satisfies: T2>88%. A transmittance T3 of the imaging lens assembly corresponding to a wave band of 430 nm satisfies: T3>75%. An optical lens of glass material is used in the imaging lens assembly of the present disclosure, so that the lens assembly has a higher transmittance, and thus the lens assembly has higher brightness, a higher permeability, and a higher color reproduction performance during the imaging.

In the embodiments of the present disclosure, an influence ratio $dng/dt$ of a unit temperature to a unit refractive index of the glass aspheric lens and a influence ratio $dni/dt$ of a unit temperature to a unit refractive index of a lens closest to the image side satisfy: $|dng/dt|/|dni/dt|<0.1$, and more specifically, satisfy: $|dng/dt|/|dni/dt|\leq 0.03$. By satisfying the above relationship, it may be ensured that the lens assembly has high resolution at different temperatures, which reduces the sensitivity of the lens assembly to the temperature.

In the embodiments of the present disclosure, an abbe number Vg of the glass aspheric lens and an abbe number Vi of the lens closest to the image side satisfy: $0.35<Vg/Vi<1.5$, and more specifically, satisfy: $0.37 \leq Vg/Vi \leq 1.46$. When the glass lens is used in the imaging lens assembly of the present disclosure, the abbe number of the glass lens is reasonably distributed by satisfying the above relationship, which is conductive to greatly reducing the chromatic aberration of the optical system.

In the embodiments of the present disclosure, a refractive index Ng of the glass aspheric lens satisfies: $1.5 \leq Ng \leq 2.0$, and more specifically, satisfies: $1.5 \leq Ng \leq 1.92$. By satisfying the above relationship, the range of the refractive index of the glass lens is reasonably selected to avoid the use of the high-priced glass, thereby ensuring the cost of the lens assembly.

In the embodiments of the present disclosure, an effective focal length f of the imaging lens assembly and an entrance pupil diameter of the imaging lens assembly satisfy: $1.5<f/EPD<2.5$, and more specifically, satisfy: $1.68 \leq f/EPD \leq 2.28$. The imaging lens assembly satisfying the above relationship has a larger luminous flux, which makes the lens assembly acquire sufficiently high brightness.

In the embodiments of the present disclosure, the effective focal length f of the imaging lens assembly and an effective focal length fg of the glass aspheric lens satisfy: $-0.6<f/fg<1.2$, and more specifically, $-0.52 \leq f/fg \leq 1.05$. By satisfying the above relationship, the refractive power of the glass lens in the entire system can be reasonably distributed, which makes the system acquire a higher MTF performance.

In the embodiments of the present disclosure, the effective focal length f of the imaging lens assembly and a radius of curvature R1 of the object-side surface of the first lens satisfy: $2<f/R1<4$, and more specifically, satisfy: $2.35 \leq f/R1 \leq 3.85$. By satisfying the above relationship, the radius of curvature of the object-side surface of the first lens is set within a reasonable range, which ensures that the entire lens assembly has a good tolerance sensitivity, to match the processing capability.

In the embodiments of the present disclosure, the radius of curvature R1 of the object-side surface of the first lens and a radius of curvature R4 of the image-side surface of the second lens satisfy: $0<R1/R4<1.0$, and more specifically, satisfy: $0.43 \leq R1/R4 \leq 0.91$. By satisfying the above relationship, the curvature of the first lens can be effectively matched with the curvature of the second lens, and thus the lateral chromatic aberration of the system may be reduced, which ensures that the color reproduction during the use of the chip is not affected.

The present disclosure is further described below in combination with specific embodiments.

Embodiment 1

First, an imaging lens assembly according to Embodiment 1 of the present disclosure is described with reference to FIGS. 1-5.

Figure 1:
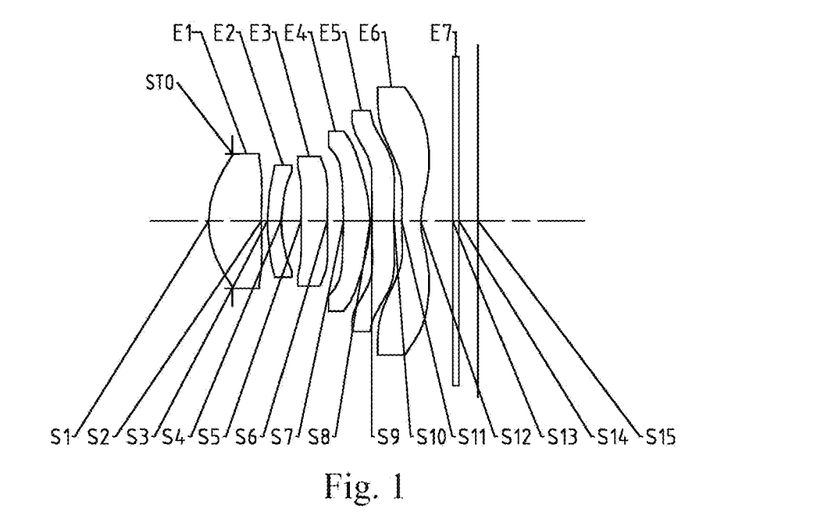
FIG. 1 is a schematic structural diagram illustrating an imaging lens assembly according to Embodiment 1.

FIG. 1 is a schematic structural diagram illustrating the imaging lens assembly according to Embodiment 1. As shown in FIG. 1, the imaging lens assembly includes six lenses. The six lenses are respectively the first lens E1 having an object-side surface S1 and an image-side surface S2, the second lens E2 having an object-side surface S3 and an image-side surface S4, the third lens E3 having an object-side surface S5 and an image-side surface S6, the fourth lens E4 having an object-side surface S7 and an image-side surface S8, the fifth lens E5 having an object-side surface S9 and an image-side surface S10, and the sixth lens E6 having an object-side surface S11 and an image-side surface S12. The first to sixth lenses E1-E6 are sequentially arranged from an object side to an image side of the imaging lens assembly.

The first lens E1 may have a positive refractive power. The object-side surface S1 of the first lens E1 may be a convex surface, and the image-side surface S2 of the first lens E1 is a concave surface.

The second lens E2 may have a negative refractive power. The object-side surface S3 of the second lens E2 may be a convex surface, and the image-side surface S4 of the second lens E2 may be a concave surface.

The third lens E3 may have a negative refractive power. The object-side surface S5 of the third lens E3 may be a convex surface, and the image-side surface S6 of the third lens E3 may be a concave surface.

The fourth lens E4 may have a positive refractive power. The object-side surface S7 of the fourth lens E4 may be a concave surface, and the image-side surface S8 of the fourth lens E4 may be a convex surface.

The fifth lens E5 may have a positive refractive power. The object-side surface S9 of the fifth lens E5 may be a convex surface, and the image-side surface S10 of the fifth lens E5 may be a convex surface.

The sixth lens E6 may have a positive refractive power or a negative refractive power. The object-side surface S11 of the sixth lens E6 may be a convex surface, and the image-side surface S12 of the sixth lens E6 may be a concave surface.

The imaging lens assembly further includes an optical filter E7 having an object-side surface S13 and an image-side surface S14 for filtering out infrared light. In this embodiment, light from an object sequentially passes through the surfaces S1-S14 and finally forms an image on an image plane S15.

In this embodiment, the first to sixth lenses E1-E6 have respective effective focal lengths f1-f6. The first to sixth lenses E1-E6 are sequentially arranged along an optical axis and collectively determine a total effective focal length f of the imaging lens assembly. Table 1 below shows the effective focal lengths f1-f6 of the first to sixth lenses E1-E6, the total effective focal length f of the imaging lens assembly, the total length TTL (mm) of the imaging lens assembly, and the half of the maximum field-of-view HFOV of the imaging lens assembly.

TABLE 1

| f1(mm) | 3.80 | f(mm) | 3.98 |
|---|---|---|---|
| f2(mm) | −13.15 | TTL(mm) | 4.75 |
| f3(mm) | −799.36 | HFOV(°) | 37.2 |
| f4(mm) | 4.59 | | |
| f5(mm) | 62.19 | | |
| f6(mm) | −3.27 | | |

Table 2 shows the surface type, the radius of curvature, the thickness, the material and the conic coefficient of each lens of the imaging lens assembly in this embodiment. The units of the radius of curvature and the thickness are both millimeters (mm).

TABLE 2

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.4178 | | | |
| S1 | aspheric | 1.6265 | 0.9317 | 1.50 | 81.6 | −2.7251 |
| S2 | aspheric | 9.5219 | 0.1069 | | | −69.9000 |
| S3 | aspheric | 2.9243 | 0.2400 | 1.67 | 20.4 | −15.8914 |
| S4 | aspheric | 2.1215 | 0.3450 | | | −15.2857 |
| S5 | aspheric | 9.4949 | 0.4642 | 1.55 | 56.1 | −27.3363 |
| S6 | aspheric | 9.1324 | 0.2869 | | | −68.9242 |
| S7 | aspheric | −7.9254 | 0.4716 | 1.54 | 55.9 | −22.7422 |
| S8 | aspheric | −1.9197 | 0.0300 | | | −9.9311 |
| S9 | aspheric | 85.4697 | 0.3899 | 1.65 | 23.5 | −69.9000 |
| S10 | aspheric | −75.4463 | 0.1365 | | | −42.4089 |
| S11 | aspheric | 3.2865 | 0.3347 | 1.54 | 55.9 | −68.3428 |
| S12 | aspheric | 1.1034 | 0.5654 | | | −6.9622 |
| S13 | spherical | infinite | 0.1100 | 1.52 | 64.2 | |
| 14 | spherical | infinite | 0.3371 | | | |
| S15 | spherical | infinite | | | | |

In this embodiment, each lens may be an aspheric lens. The surface type x of each aspheric surface is defined by the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 2 above); k is the conic coefficient (given in Table 2); and $A_i$ is the correction coefficient of the $i^{th}$ order of the aspheric surface.

Table 3 below shows the high-order coefficients $A_4$, $A_6$, $A_8$, $A_{10}$, $A_{12}$, $A_{14}$, and $A_{16}$ applicable to the aspheric surfaces S1-S12 of the aspheric lenses in this embodiment.

TABLE 3

| surface number | A4 | A6 | A8 | A10 | A12 | A14 | A16 |
|---|---|---|---|---|---|---|---|
| S1 | 6.7997E−02 | −1.0838E−02 | −1.3608E−02 | 2.6747E−02 | −2.8199E−02 | −2.7550E−03 | 0 |
| S2 | −1.2817E−01 | 1.9200E−01 | −2.0493E−01 | 9.1988E−02 | −7.8504E−03 | −1.4426E−04 | 0 |
| S3 | −1.1770E−01 | 2.5939E−01 | −2.3979E−01 | 2.0491E−01 | −2.5180E−01 | −7.7637E−02 | 0 |
| S4 | 6.8034E−02 | −6.1153E−02 | 3.9792E−01 | −8.4952E−01 | 1.1184E+00 | 3.3172E−01 | 0 |
| S5 | −1.2157E−01 | −1.0010E−01 | 5.6687E−01 | −1.6551E+00 | 2.6813E+00 | 8.1982E−01 | 0 |
| S6 | −8.1545E−02 | 1.2847E−02 | −1.9958E−01 | 3.3446E−01 | −2.9092E−01 | −1.8820E−02 | 0 |

TABLE 3-continued

| surface number | A4 | A6 | A8 | A10 | A12 | A14 | A16 |
|---|---|---|---|---|---|---|---|
| S7 | 1.8502E−02 | 1.7304E−01 | −4.7368E−01 | 4.7737E−01 | −2.6772E−01 | 7.4387E−02 | −6.8273E−03 |
| S8 | −4.9933E−03 | 1.0585E−01 | −2.7614E−01 | 2.9143E−01 | −1.5441E−01 | −4.1718E−03 | 0 |
| S9 | 1.7488E−01 | −3.7184E−01 | 2.4379E−01 | −9.9592E−02 | 3.0269E−02 | 4.5700E−04 | 0 |
| S10 | 1.8257E−01 | −3.7618E−01 | 2.7075E−01 | −1.1502E−01 | 3.0228E−02 | 2.6014E−04 | 0 |
| S11 | −2.4321E−01 | 3.2139E−02 | 6.8480E−02 | −4.0675E−02 | 1.0132E−02 | 5.7167E−05 | 0 |
| S12 | −1.9844E−01 | 1.2031E−01 | −4.3468E−02 | 9.5673E−03 | −1.2854E−03 | −2.6916E−06 | 0 |

Figure 2:
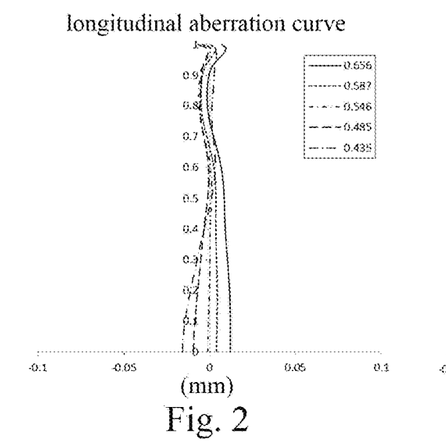
FIGS. 2-5 respectively illustrate a longitudinal aberration curve, an astigmatic curve, a distortion curve, and a lateral color curve of the imaging lens assembly according to Embodiment 1.
Figure 3:
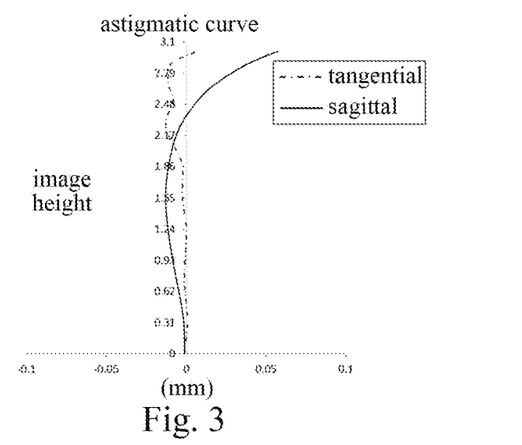
Figure 4:
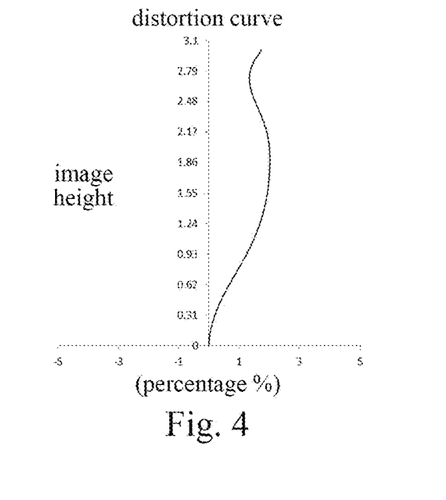
Figure 5:
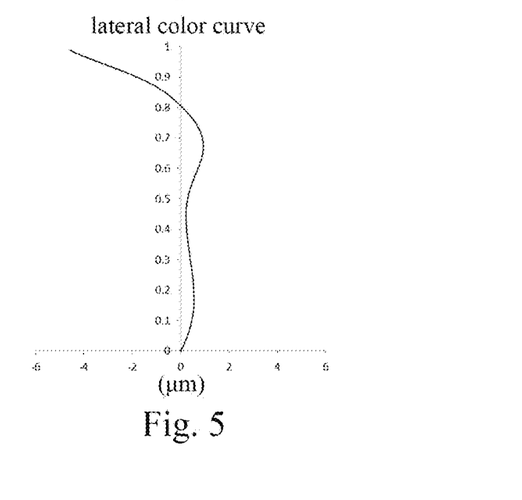

FIG. 2 illustrates the longitudinal aberration curve of the imaging lens assembly according to Embodiment 1, representing deviations of focal points of light of different wavelengths converged after passing through the optical system. FIG. 3 illustrates the astigmatic curve of the imaging lens assembly according to Embodiment 1, representing a curvature of the tangential image plane and a curvature of the sagittal image plane. FIG. 4 illustrates the distortion curve of the imaging lens assembly according to Embodiment 1, representing amounts of distortion at different viewing angles. FIG. 5 illustrates the lateral color curve of the imaging lens assembly according to Embodiment 1, representing deviations of different image heights on the image plane after light passes through the imaging lens assembly. In summary, it can be seen from FIGS. 2-5 that the imaging lens assembly according to Embodiment 1 is an imaging lens assembly including a glass lens and having an improved imaging performance.

Embodiment 2

An imaging lens assembly according to Embodiment 2 of the present disclosure is described below with reference to FIGS. 6-10. Except for the parameters of the lenses in the imaging lens assembly, for example, except for the radii of curvature, the thicknesses, the materials, the conic coefficients, and the effective focal lengths of the lenses, the axial spacing distances between the lenses, the high-order coefficients of the lenses, etc., the imaging lens assemblies in Embodiment 2 and the following embodiments are the same as the imaging lens assembly described in Embodiment 1 in arrangement. In this embodiment and the following embodiments, for the purpose of brevity, the description of parts similar to those in Embodiment 1 will be omitted.

Figure 6:
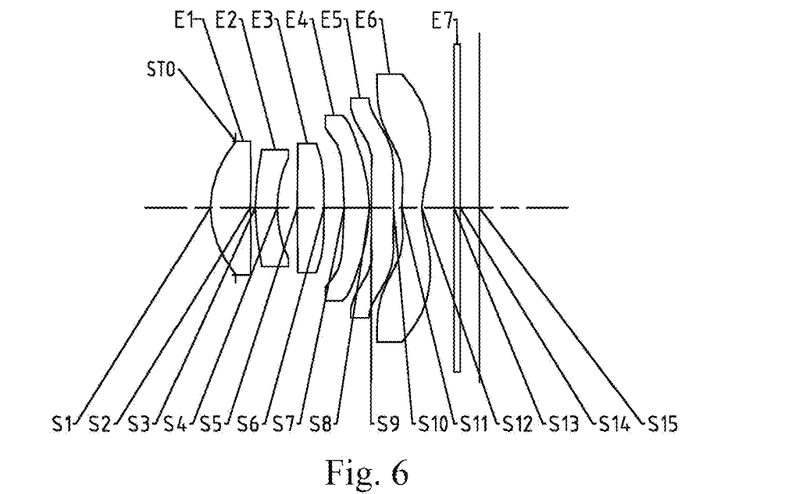
FIG. 6 is a schematic structural diagram illustrating an imaging lens assembly according to Embodiment 2.

FIG. 6 is a schematic structural diagram illustrating the imaging lens assembly according to Embodiment 2. The imaging lens assembly includes, sequentially from an object side to an image side, a first lens E1, a second lens E2, a third lens E3, a fourth lens E4, a fifth lens E5, and a sixth lens E6.

The first lens E1 may have a positive refractive power, an object-side surface S1 of the first lens E1 may be a convex surface, and an image-side surface S2 of the first lens E1 is a concave surface.

The second lens E2 may have a negative refractive power, an object-side surface S3 of the second lens E2 may be a convex surface, and an image-side surface S4 of the second lens E2 may be a concave surface.

The third lens E3 may have a positive refractive power, an object-side surface S5 of the third lens E3 may be a convex surface, and an image-side surface S6 of the third lens E3 may be a convex surface.

The fourth lens E4 may have a positive refractive power, an object-side surface S7 of the fourth lens E4 may be a concave surface, and an image-side surface S8 of the fourth lens E4 may be a convex surface.

The fifth lens E5 may have a positive refractive power, an object-side surface S9 of the fifth lens E5 may be a concave surface, and an image-side surface S10 of the fifth lens E5 may be a convex surface.

The sixth lens E6 may have a negative refractive power, an object-side surface S11 of the sixth lens E6 may be a convex surface, and an image-side surface S12 of the sixth lens E6 may be a concave surface.

Table 4 below shows the effective focal lengths f1-f6 of the first to sixth lenses E1-E6, the total effective focal length f of the imaging lens assembly, the total length TTL of the imaging lens assembly, and the half of the maximal field-of-view HFOV of the imaging lens assembly.

TABLE 4

| f1(mm) | 3.84 | f(mm) | 3.95 |
|---|---|---|---|
| f2(mm) | −7.64 | TTL(mm) | 4.74 |
| f3(mm) | 12.86 | HFOV(°) | 36.9 |
| f4(mm) | 5.44 | | |
| f5(mm) | 24.57 | | |
| f6(mm) | −3.20 | | |

Table 5 shows the surface type, the radius of curvature, the thickness, the material and the conic coefficient of each lens of the imaging lens assembly in this embodiment. The units of the radius of curvature and the thickness are both millimeters (mm).

TABLE 5

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4449 | | | |
| S1 | aspheric | 1.6598 | 0.7038 | 1.55 | 56.1 | −2.4418 |
| S2 | aspheric | 6.7785 | 0.0869 | | | −58.2503 |
| S3 | aspheric | 2.9932 | 0.3900 | 1.92 | 20.9 | −22.2498 |
| S4 | aspheric | 1.9755 | 0.3512 | | | −8.8489 |
| S5 | aspheric | 7.6402 | 0.4760 | 1.54 | 55.9 | 11.2779 |

TABLE 5-continued

| surface number | surface type | radius of curvature | thickness | material refractive index | abbe number | conic coefficient |
|---|---|---|---|---|---|---|
| S6 | aspheric | −70.4453 | 0.3561 | | | 18.0000 |
| S7 | aspheric | −6.5059 | 0.4473 | 1.54 | 55.9 | 9.1913 |
| S8 | aspheric | −2.0647 | 0.0300 | | | −8.4608 |
| S9 | aspheric | −39.9288 | 0.3904 | 1.65 | 23.5 | 8.5860 |
| S10 | aspheric | −11.3881 | 0.1414 | | | −69.0021 |
| S11 | aspheric | 2.8972 | 0.3490 | 1.54 | 55.9 | −64.2647 |
| S12 | aspheric | 1.0339 | 0.5708 | | | −6.9206 |
| S13 | spherical | infinite | 0.1100 | 1.52 | 64.2 | |
| S14 | spherical | infinite | 0.3371 | | | |
| S15 | spherical | infinite | | | | |

Table 6 below shows the high-order coefficients applicable to the aspheric surfaces S1-S12 of the aspheric lenses in this embodiment. The surface type of each aspheric surface may be defined by the formula (1) given in Embodiment 1.

TABLE 6

| surface number | A4 | A6 | A8 | A10 | A12 | A14 | A16 |
|---|---|---|---|---|---|---|---|
| S1 | 5.9884E−02 | 1.2520E−02 | −7.1245E−02 | 1.4101E−01 | −1.5030E−01 | 8.2919E−02 | −1.9445E−02 |
| S2 | −1.7031E−01 | 3.5300E−01 | −4.9955E−01 | 5.3066E−01 | −4.0669E−01 | 1.8440E−01 | −3.6780E−02 |
| S3 | −8.2834E−02 | 1.7005E−01 | −1.3630E−01 | 5.3446E−02 | −9.8162E−03 | 0 | 0 |
| S4 | 4.3748E−02 | 4.8250E−02 | −1.6099E−02 | 1.0532E−02 | 0 | 0 | 0 |
| S5 | −8.0300E−02 | 2.6901E−02 | −8.0864E−02 | 1.5107E−01 | −1.1364E−01 | 2.3530E−02 | 2.0176E−02 |
| S6 | −6.5578E−02 | 3.9312E−02 | −2.3502E−01 | 3.1615E−01 | −1.8188E−01 | 2.0441E−02 | 1.7567E−02 |
| S7 | −9.1358E−03 | 2.5500E−01 | −5.5098E−01 | 4.8140E−01 | −2.0903E−01 | 3.2763E−02 | 1.7135E−03 |
| S8 | 2.3723E−02 | 1.3952E−01 | −4.4187E−01 | 4.6780E−01 | −2.3769E−01 | 5.9287E−02 | −5.8798E−03 |
| S9 | 2.4015E−01 | −3.7778E−01 | 1.6217E−01 | −1.8838E−02 | −4.1738E−03 | 1.3279E−03 | −1.0689E−04 |
| S10 | 2.2254E−01 | −3.6616E−01 | 2.1163E−01 | −6.7669E−02 | 1.3330E−02 | −1.5119E−03 | 7.4009E−05 |
| S11 | −2.5460E−01 | 3.1826E−02 | 6.4993E−02 | −3.4925E−02 | 7.7475E−03 | −8.1718E−04 | 3.3285E−05 |
| S12 | −1.9219E−01 | 1.0351E−01 | −3.0228E−02 | 4.1863E−03 | −1.2383E−04 | −3.0892E−05 | 2.5932E−06 |

Figure 7:
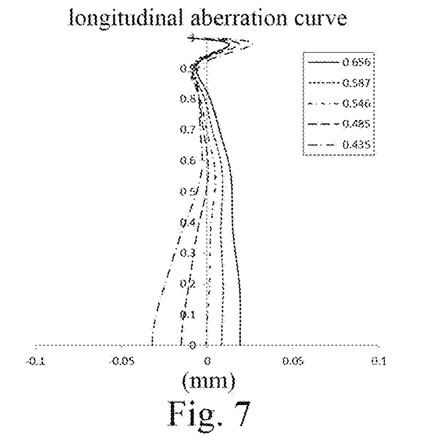
FIGS. 7-10 respectively illustrate a longitudinal aberration curve, an astigmatic curve, a distortion curve, and a lateral color curve of the imaging lens assembly according to Embodiment 2.
Figure 8:
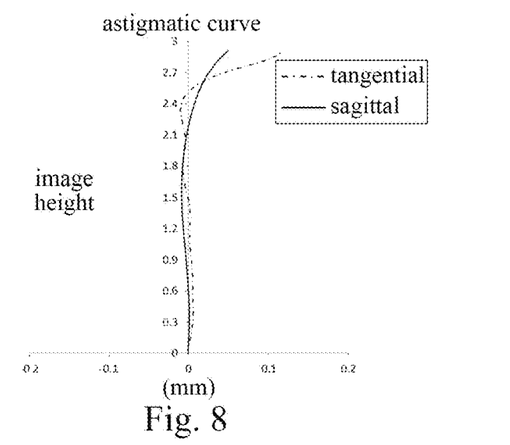
Figure 9:
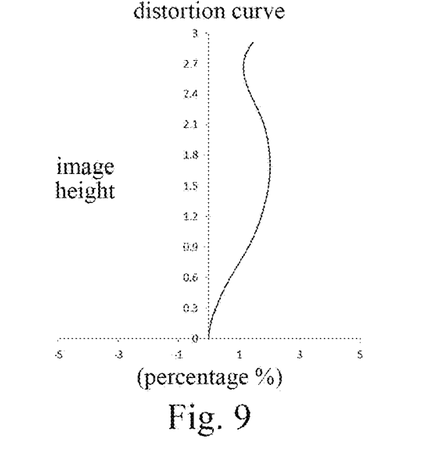
Figure 10:
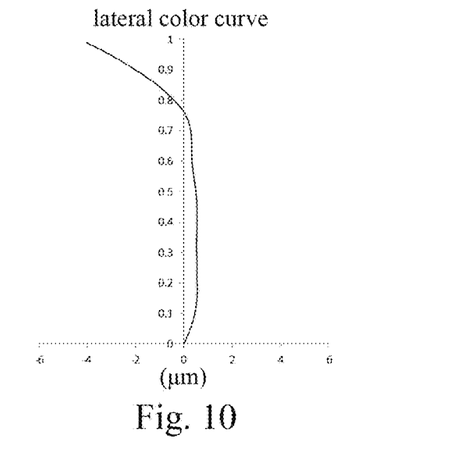

FIG. 7 illustrates the longitudinal aberration curve of the imaging lens assembly according to Embodiment 2, representing deviations of focal points of light of different wavelengths converged after passing through the optical system. FIG. 8 illustrates the astigmatic curve of the imaging lens assembly according to Embodiment 2, representing a curvature of the tangential image plane and a curvature of the sagittal image plane. FIG. 9 illustrates the distortion curve of the imaging lens assembly according to Embodiment 2, representing amounts of distortion at different viewing angles. FIG. 10 illustrates the lateral color curve of the imaging lens assembly according to Embodiment 2, representing deviations of different image heights on the image plane after light passes through the imaging lens assembly. In summary, it can be seen from FIGS. 7-10 that the imaging lens assembly according to Embodiment 2 is an imaging lens assembly including a glass lens and having an improved imaging performance.

Embodiment 3

An imaging lens assembly according to Embodiment 3 of the present disclosure is described below with reference to FIGS. 11-15.

Figure 11:
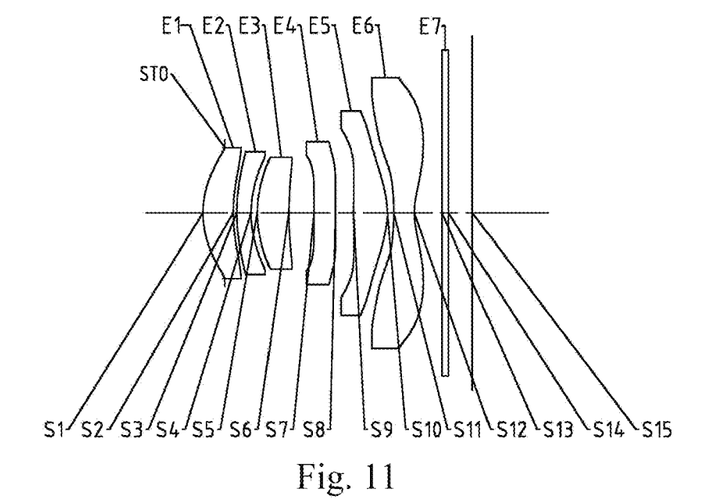
FIG. 11 is a schematic structural diagram illustrating an imaging lens assembly according to Embodiment 3.

FIG. 11 is a schematic structural diagram illustrating the imaging lens assembly according to Embodiment 3. The imaging lens assembly includes, sequentially from an object side to an image side, a first lens E1, a second lens E2, a third lens E3, a fourth lens E4, a fifth lens E5, and a sixth lens E6.

The first lens E1 may have a positive refractive power. An object-side surface S1 of the first lens E1 may be a convex surface, and an image-side surface S2 of the first lens E1 is a concave surface.

The second lens E2 may have a negative refractive power. An object-side surface S3 of the second lens E2 may be a convex surface, and an image-side surface S4 of the second lens E2 may be a concave surface.

The third lens E3 may have a positive refractive power. An object-side surface S5 of the third lens E3 may be a convex surface, and an image-side surface S6 of the third lens E3 may be a concave surface.

The fourth lens E4 may have a positive refractive power. An object-side surface S7 of the fourth lens E4 may be a convex surface, and an image-side surface S8 of the fourth lens E4 may be a concave surface.

The fifth lens E5 may have a positive refractive power. An object-side surface S9 of the fifth lens E5 may be a convex surface, and an image-side surface S10 of the fifth lens E5 may be a convex surface.

The sixth lens E6 may have a negative refractive power. An object-side surface S11 of the sixth lens E6 may be a concave surface, and an image-side surface S12 of the sixth lens E6 may be a concave surface.

Table 7 below shows the effective focal lengths f1-f6 of the first to sixth lenses E1-E6, the total effective focal length f of the imaging lens assembly, the total length TTL of the imaging lens assembly, and the half of the maximal field-of-view HFOV of the imaging lens assembly.

TABLE 7

| f1(mm) | 5.87 | f(mm) | 3.89 |
|---|---|---|---|
| f2(mm) | −6.27 | TTL(mm) | 4.73 |
| f3(mm) | 4.13 | HFOV(°) | 38.0 |
| f4(mm) | −42.33 | | |

TABLE 7-continued

| | |
|---|---|
| f5(mm) | 2.31 |
| f6(mm) | −1.89 |

Table 8 shows the surface type, the radius of curvature, the thickness, the material and the conic coefficient of each lens of the imaging lens assembly in this embodiment. The units of the radius of curvature and the thickness are both millimeters (mm).

TABLE 8

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.3856 | | | |
| S1 | aspheric | 1.6564 | 0.5305 | 1.55 | 56.1 | −2.7685 |
| S2 | aspheric | 3.0345 | 0.0643 | | | −7.0074 |
| S3 | aspheric | 3.4228 | 0.2500 | 1.67 | 20.4 | −1.0228 |
| S4 | aspheric | 1.8284 | 0.1090 | | | −2.2943 |
| S5 | aspheric | 1.9501 | 0.5478 | 1.69 | 53.1 | −2.1266 |
| S6 | aspheric | 5.3548 | 0.4434 | | | −53.4864 |
| S7 | aspheric | 21.7115 | 0.3771 | 1.65 | 23.5 | −90.0000 |
| S8 | aspheric | 12.0121 | 0.3214 | | | −89.1222 |
| S9 | aspheric | 22.4123 | 0.5950 | 1.54 | 55.9 | −37.1786 |
| S10 | aspheric | −1.3034 | 0.1116 | | | −0.8999 |
| S11 | aspheric | −4.8754 | 0.3600 | 1.54 | 55,9 | −0.0069 |
| S12 | aspheric | 1.3153 | 0.4885 | | | −7.6010 |
| S13 | spherical | infinite | 0.1100 | 1.52 | 64.2 | |
| S14 | spherical | infinite | 0.4214 | | | |
| S15 | spherical | infinite | | | | |

Table 9 below shows the high-order coefficients applicable to the aspheric surfaces S1-S12 of the aspheric lenses in this embodiment. The surface type of each aspheric surface may be defined by the formula (1) given in Embodiment 1.

TABLE 9

| surface number | A4 | A6 | A8 | A10 | A12 | A14 | A16 | A18 |
|---|---|---|---|---|---|---|---|---|
| S1 | 6.7750E−02 | −2.3812E−02 | −7.1382E−03 | 1.6614E−02 | −1.7261E−02 | 5.2311E−03 | 0 | 0 |
| S2 | 9.5732E−02 | −2.1355E−01 | 1.3275E−01 | −2.9433E−02 | 0 | 0 | 0 | 0 |
| S3 | 5.0053E−02 | −1.5870E−01 | 1.4302E−01 | −4.3142E−02 | 0 | 0 | 0 | 0 |
| S4 | −2.1995E−02 | 1.3891E−02 | 6.0708E−02 | −5.2138E−02 | 0 | 0 | 0 | 0 |
| S5 | −2.5279E−02 | 3.5894E−02 | −2.7905E−02 | 2.0346E−02 | −1.0814E−02 | 0 | 0 | 0 |
| S6 | 2.5036E−02 | −3.4922E−02 | 0 | 0 | 0 | 0 | 0 | 0 |
| S7 | −1.1380E−01 | 5.7022E−02 | −1.6606E−01 | 1.4740E−01 | −6.8711E−02 | 0 | 0 | 0 |
| S8 | −8.9880E−02 | 7.4402E−03 | −1.8637E−02 | 5.6152E−02 | −1.0948E−01 | 1.1187E−01 | −5.0281E−02 | 8.0165E−03 |
| S9 | 3.3858E−03 | 5.8082E−03 | −2.6128E−01 | 5.0754E−01 | −4.9163E−01 | 2.5871E−01 | −6.9584E−02 | 7.4651E−03 |
| S10 | 4.8112E−01 | −7.3920E−01 | 6.8320E−01 | −3.3116E−01 | 7.3466E−02 | −1.1625E−03 | −2.2888E−03 | 2.8050E−04 |
| S11 | 6.2838E−02 | −4.4983E−01 | 5.7784E−01 | −3.4371E−01 | 1.1367E−01 | −2.1632E−02 | 2.2277E−03 | −9.6542E−05 |
| S12 | −1.4238E−01 | 7.9143E−02 | −2.7097E−02 | 4.4431E−03 | 1.5017E−04 | −1.9761E−04 | 3.0840E−05 | −1.5870E−06 |

Figure 12:
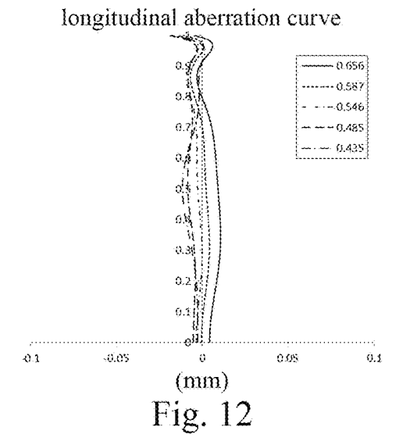
FIGS. 12-15 respectively illustrate a longitudinal aberration curve, an astigmatic curve, a distortion curve, and a lateral color curve of the imaging lens assembly according to Embodiment 3.
Figure 13:
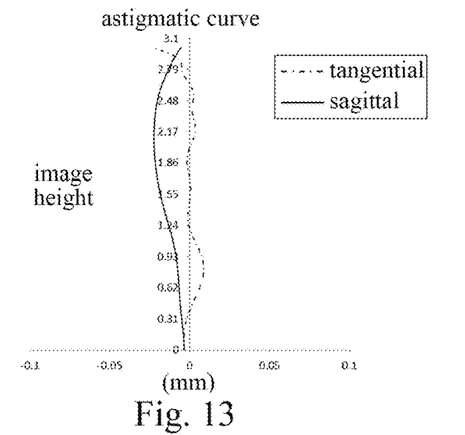
Figure 14:
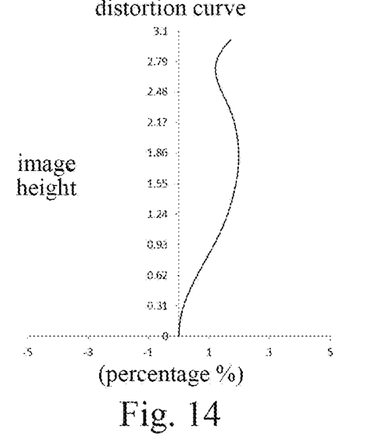
Figure 15:
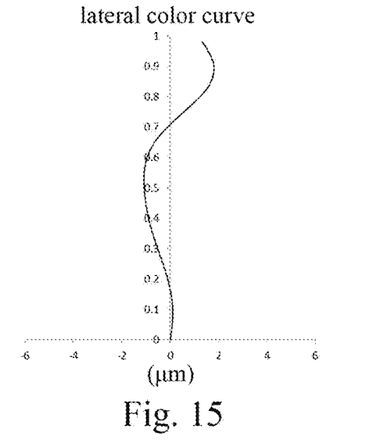

FIG. 12 illustrates the longitudinal aberration curve of the imaging lens assembly according to Embodiment 3, representing deviations of focal points of light of different wavelengths converged after passing through the optical system. FIG. 13 illustrates the astigmatic curve of the imaging lens assembly according to Embodiment 3, representing a curvature of the tangential image plane and a curvature of the sagittal image plane. FIG. 14 illustrates the distortion curve of the imaging lens assembly according to Embodiment 3, representing amounts of distortion at different viewing angles. FIG. 15 illustrates the lateral color curve of the imaging lens assembly according to Embodiment 3, representing deviations of different image heights on the image plane after light passes through the imaging lens assembly.

In summary, it can be seen from FIGS. 12-15 that the imaging lens assembly according to Embodiment 3 is an imaging lens assembly including a glass lens and having an improved imaging performance.

Embodiment 4

An imaging lens assembly according to Embodiment 4 of the present disclosure is described below with reference to FIGS. 16-20.

Figure 16:
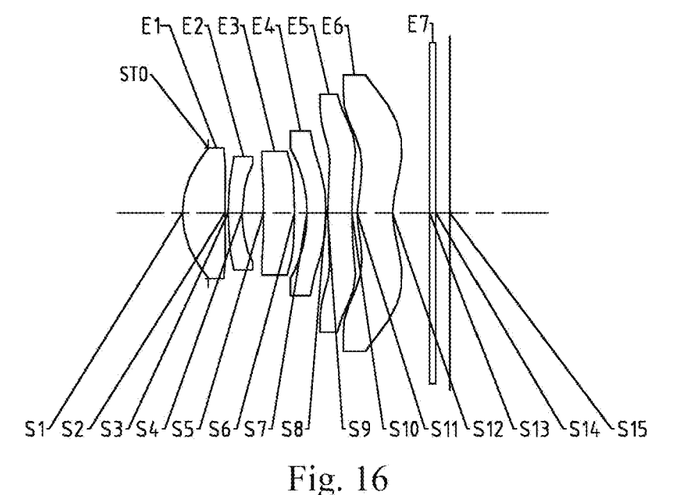
FIG. 16 is a schematic structural diagram illustrating an imaging lens assembly according to Embodiment 4.

FIG. 16 is a schematic structural diagram illustrating the imaging lens assembly according to Embodiment 4. The imaging lens assembly includes, sequentially from an object side to an image side, a first lens E1, a second lens E2, a third lens E3, a fourth lens E4, a fifth lens E5, and a sixth lens E6.

The first lens E1 may have a positive refractive power, an object-side surface S1 of the first lens E1 may be a convex surface, and an image-side surface S2 of the first lens E1 is a concave surface.

The second lens E2 may have a negative refractive power, an object-side surface S3 of the second lens E2 may be a convex surface, and an image-side surface S4 of the second lens E2 may be a concave surface.

The third lens E3 may have a positive refractive power, an object-side surface S5 of the third lens E3 may be a convex surface, and an image-side surface S6 of the third lens E3 may be a convex surface.

The fourth lens E4 may have a negative refractive power, an object-side surface S7 of the fourth lens E4 may be a concave surface, and an image-side surface S8 of the fourth lens E4 may be a convex surface.

The fifth lens E5 may have a positive refractive power, an object-side surface S9 of the fifth lens E5 may be a convex surface, and an image-side surface S10 of the fifth lens E5 may be a concave surface.

The sixth lens E6 may have a positive refractive power, an object-side surface S11 of the sixth lens E6 may be a convex surface, and an image-side surface S12 of the sixth lens E6 may be a concave surface.

Table 10 below shows the effective focal lengths f1-f6 of the first to sixth lenses E1-E6, the total effective focal length f of the imaging lens assembly, the total length TTL of the imaging lens assembly, and the half of the maximal field-of-view HFOV of the imaging lens assembly.

TABLE 10

| f1(mm) | 3.15 | f(mm) | 3.87 |
|---|---|---|---|
| f2(mm) | −7.63 | TTL(mm) | 4.74 |
| f3(mm) | 17.97 | HFOV(°) | 38.2 |
| f4(mm) | −9.05 | | |
| f5(mm) | 37.91 | | |
| f6(mm) | 48.11 | | |

Table 11 below shows the surface type, the radius of curvature, the thickness, the material and the conic coefficient of each lens of the imaging lens assembly in this embodiment. The units of the radius of curvature and the thickness are both millimeters (mm).

TABLE 11

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.4571 | | | |
| S1 | aspheric | 1.5377 | 0.7560 | 1.55 | 56.1 | −0.1580 |
| S2 | aspheric | 12.0240 | 0.0549 | | | −69.3026 |
| S3 | aspheric | 3.9552 | 0.2500 | 1.67 | 20.4 | −44.3277 |
| S4 | aspheric | 2.1695 | 0.3699 | | | 3.8156 |
| S3 | aspheric | 45.8444 | 0.5511 | 1.69 | 53.1 | 63.0000 |
| S6 | aspheric | −17.1501 | 0.2217 | | | −69.9000 |
| S7 | aspheric | −3.7186 | 0.3360 | 1.65 | 23.5 | 5.2947 |
| S8 | aspheric | −10.6118 | 0.0300 | | | −1.9150 |
| S9 | aspheric | 9.1918 | 0.4299 | 1.65 | 23.5 | 13.9741 |
| S10 | aspheric | 14.4589 | 0.0939 | | | 45.2322 |
| S11 | aspheric | 1.4477 | 0.6273 | 1.54 | 55.9 | −5.2311 |
| S12 | aspheric | 1.3014 | 0.6608 | | | −1.9416 |
| S13 | spherical | infinite | 0.1100 | 1.52 | 64.2 | |
| S14 | spherical | infinite | 0.2485 | | | |
| S15 | spherical | infinite | | | | |

Table 12 below shows the high-order coefficients applicable to the aspheric surfaces S1-S12 of the aspheric lenses in this embodiment. The surface type of each aspheric surface may be defined by the formula (1) given in Embodiment 1.

TABLE 12

| Surface number | A4 | A6 | A8 | A10 | A12 | A14 | A16 | A18 |
|---|---|---|---|---|---|---|---|---|
| S1 | −1.9643E−04 | 1.6067E−02 | −5.9355E−02 | 1.0605E−01 | −1.1519E−01 | 6.5562E−02 | −1.7706E−02 | 0 |
| S2 | −1.6190E−01 | 4.8961E−01 | −9.2555E−01 | 1.1240E+00 | −8.8060E−01 | 3.8731E−01 | −7.2572E−02 | 0 |
| S3 | −1.3350E−01 | 4.9099E−01 | −8.2777E−01 | 9.3341E−01 | −6.6444E−01 | 2.6096E−01 | −3.8602E−02 | 0 |
| S4 | −1.4808E−01 | 2.7510E−01 | −5.2166E−01 | 9.0345E−01 | −1.2865E+00 | 1.1443E+00 | −4.7310E−01 | 0 |
| S5 | −7.4480E−02 | 2.8545E−03 | 3.7393E−05 | 0 | 0 | 0 | 0 | 0 |
| S6 | −1.2979E−01 | 1.0410E−01 | −6.5088E−02 | 1.5827E−02 | 0 | 0 | 0 | 0 |
| S7 | −4.0144E−01 | 8.4853E−01 | −8.7142E−01 | 4.8978E−01 | −1.2425E−01 | 0 | 0 | 0 |
| S8 | −6.0503E−01 | 1.3052E+00 | −1.7762E+00 | 1.6009E+00 | −9.2136E−01 | 3.2726E−01 | −6.6200E−02 | 5.8914E−03 |
| S9 | 4.3662E−02 | −5.3281E−03 | −1.7167E−01 | 1.6269E−01 | −6.3587E−02 | 1.1855E−02 | −8.9915E−04 | 3.3740E−06 |
| S10 | 1.3968E−01 | −1.6453E−01 | 6.6218E−02 | −2.0248E−02 | 7.7628E−03 | −2.4910E−03 | 4.3817E−04 | −3.0728E−05 |
| S11 | −3.6439E−01 | 3.3879E−01 | −2.3307E−01 | 1.0160E−01 | −2.6410E−02 | 3.9896E−03 | −3.2278E−04 | 1.0719E−05 |
| S12 | −3.2822E−01 | 2.6145E−01 | −1.6209E−01 | 6.7374E−02 | −1.7734E−02 | 2..8088E−03 | −2.4262E−04 | 8.7469E−06 |

Figure 17:
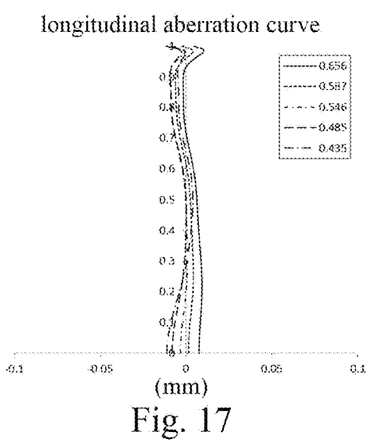
FIGS. 17-20 respectively illustrate a longitudinal aberration curve, an astigmatic curve, a distortion curve, and a lateral color curve of the imaging lens assembly according to Embodiment 4.
Figure 18:
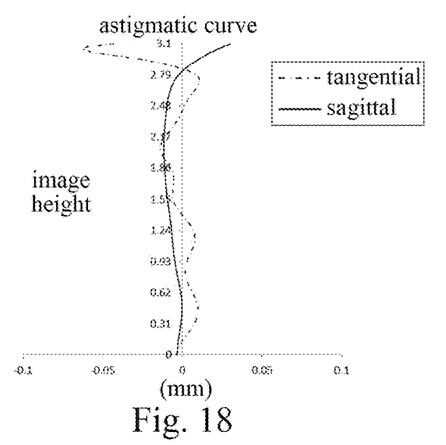
Figure 19:
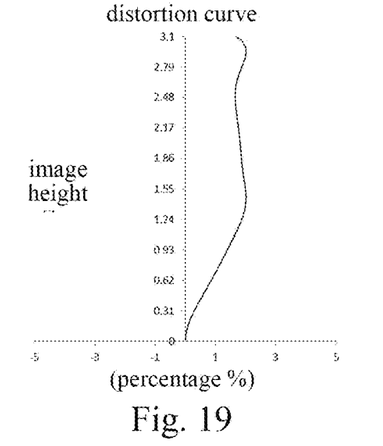
Figure 20:
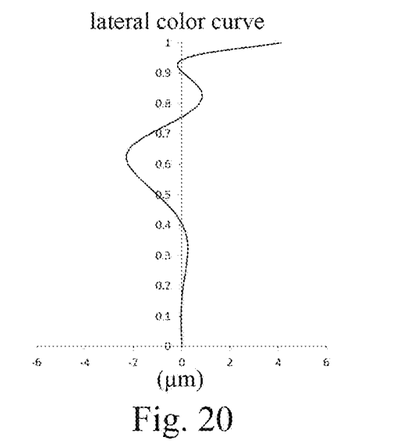

FIG. 17 illustrates the longitudinal aberration curve of the imaging lens assembly according to Embodiment 4, representing deviations of focal points of light of different wavelengths converged after passing through the optical system. FIG. 18 illustrates the astigmatic curve of the imaging lens assembly according to Embodiment 4, representing a curvature of the tangential image plane and a curvature of the sagittal image plane. FIG. 19 illustrates the distortion curve of the imaging lens assembly according to Embodiment 4, representing amounts of distortion at different viewing angles. FIG. 20 illustrates the lateral color curve of the imaging lens assembly according to Embodiment 4, representing deviations of different image heights on the image plane after light passes through the imaging lens assembly. In summary, it can be seen from FIGS. 17-20 that the imaging lens assembly according to Embodiment 4 is an imaging lens assembly including a glass lens and having an improved imaging performance.

Embodiment 5

An imaging lens assembly according to Embodiment 5 of the present disclosure is described with reference to FIGS. 21-25.

Figure 21:
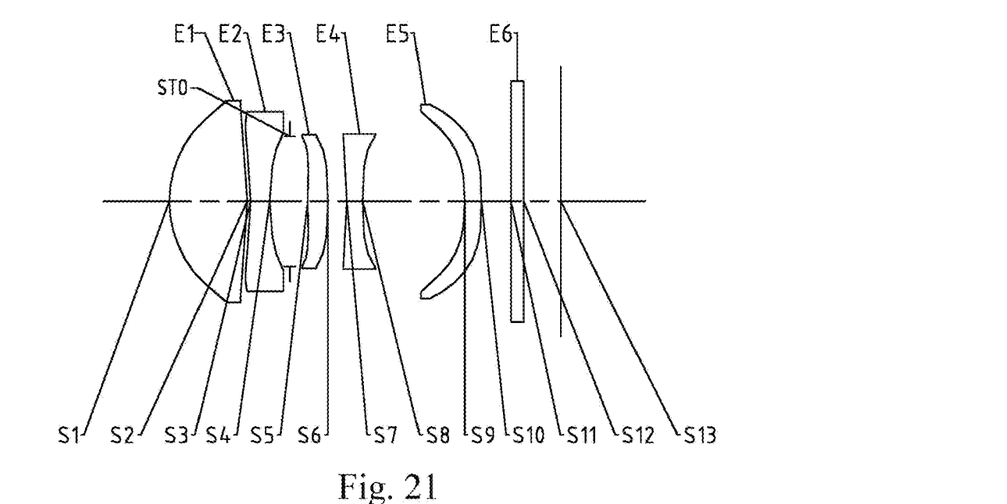
FIG. 21 is a schematic structural diagram illustrating an imaging lens assembly according to Embodiment 5.

FIG. 21 is a schematic structural diagram illustrating the imaging lens assembly according to Embodiment 5. The imaging lens assembly includes, sequentially from an object side to an image side, a first lens E1, a second lens E2, a third lens E3, a fourth lens E4, and a fifth lens E5.

The first lens E1 may have a positive refractive power, an object-side surface S1 of the first lens E1 may be a convex surface, and an image-side surface S2 of the first lens E1 is a convex surface.

The second lens E2 may have a negative refractive power, an object-side surface S3 of the second lens E2 may be a concave surface, and an image-side surface S4 of the second lens E2 may be a concave surface.

The third lens E3 may have a positive refractive power, an object-side surface S5 of the third lens E3 may be a convex surface, and an image-side surface S6 of the third lens E3 may be a convex surface.

The fourth lens E4 may have a negative refractive power, an object-side surface S7 of the fourth lens E4 may be a concave surface, and an image-side surface S8 of the fourth lens E4 may be a concave surface.

The fifth lens E5 may have a negative refractive power, an object-side surface S9 of the fifth lens E5 may be a concave surface, and an image-side surface S10 of the fifth lens E5 may be a convex surface.

Table 13 below shows the effective focal lengths f1-f5 of the first to sixth lenses E1-E5, the total effective focal length f of the imaging lens assembly, the total length TTL of the imaging lens assembly, and the half of the maximal field-of-view HFOV of the imaging lens assembly.

TABLE 13

| f1(mm) | 2.60 | f(mm) | 7.19 |
|---|---|---|---|
| f2(mm) | −3.20 | TTL(mm) | 6.40 |
| f3(mm) | 8.38 | HFOV(°) | 16.1 |
| f4(mm) | −5.93 | | |
| f5(mm) | −13.60 | | |

Table 14 below shows the surface type, the radius of curvature, the thickness, the material and the conic coefficient of each lens of the imaging lens assembly in this embodiment. The units of the radius of curvature and the thickness are both millimeters (mm).

TABLE 14

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.8680 | 1.2693 | 1.55 | 56.1 | −0.3307 |
| S2 | aspheric | −4.5290 | 0.0541 | | | −52.1627 |
| S3 | aspheric | −4.0217 | 0.3139 | 1.65 | 23.5 | −48.5888 |
| S4 | aspheric | 4.3609 | 0.3300 | | | −48.3575 |
| STO | spherical | infinite | 0.2938 | | | |
| S5 | aspheric | 11.7405 | 0.3283 | 1.68 | 31.0 | 99.0000 |
| S6 | aspheric | −11.1382 | 0.3118 | | | 33.8206 |
| S7 | aspheric | −4.8033 | 0.2600 | 1.55 | 56.1 | −54.7704 |
| S8 | aspheric | 10.1139 | 1.6646 | | | 52.2955 |
| S9 | aspheric | −4.8993 | 0.2745 | 1.55 | 56.1 | −9.7327 |
| S10 | aspheric | −14.6970 | 0.4835 | | | 80.6212 |
| S11 | spherical | infinite | 0.2100 | 1.52 | 64.2 | |
| S12 | spherical | infinite | 0.6060 | | | |
| S13 | spherical | infinite | | | | |

Table 15 below shows the high-order coefficients applicable to the aspheric surfaces S1-S10 of the aspheric lenses in this embodiment. The surface type of each aspheric surface may be defined by the formula (1) given in Embodiment 1.

TABLE 15

| surface number | A4 | A6 | A8 | A10 | A12 |
|---|---|---|---|---|---|
| S1 | 3.7194E−03 | 9.0984E−03 | −1.5246E−02 | 2.2521E−02 | −2.1619E−02 |
| S2 | −2.3425E−02 | 2.5578E−01 | −6.3400E−01 | 8.2060E−01 | −6.4205E−01 |
| S3 | −2.4665E−02 | 2.9247E−01 | −7.8391E−01 | 1.0842E+00 | −8.9400E−01 |
| S4 | 1.2252E−01 | −1.3913E−01 | 4.3799E−01 | −1.4254E+00 | 2.8749E+00 |

TABLE 15-continued

| | | | | | |
|---|---|---|---|---|---|
| S5 | −5.3579E−02 | 7.5157E−04 | −1.8154E−01 | 2.5464E−01 | −2.1792E−01 |
| S6 | −5.8545E−02 | −2.0826E−02 | −5.3441E−02 | 7.6002E−02 | −3.8984E−02 |
| S7 | −6.4303E−02 | 1.1747E−01 | −4.1306E−02 | −5.8346E−03 | 6.0975E−03 |
| S8 | 4.8062E−02 | 5.3285E−02 | 1.8623E−02 | −5.1790E−02 | 2.8952E−02 |
| S9 | −2.0485E−01 | 9.7262E−02 | −5.8755E−02 | 2.4421E−02 | −4.8151E−03 |
| S10 | 1.9494E−01 | 9.9115E−02 | −5.7283E−02 | 2.1529E−02 | −4.1722E−03 |

| surface number | A14 | A16 | A18 | A20 |
|---|---|---|---|---|
| S1 | 1.3679E−02 | −5.4712E−03 | 1.2650E−03 | −1.3064E−04 |
| S2 | 3.1721E−01 | −9.7532E−02 | 1.7132E−02 | −1.3185E−03 |
| S3 | 4.6014E−01 | −1.4555E−01 | 2.5959E−02 | −1.9947E−03 |
| S4 | −3.4342E+00 | 2.4228E+00 | −9.3833E−01 | 1.5476E−01 |
| S5 | 9.7129E−02 | −1.5753E−02 | 0 | 0 |
| S6 | 1.0369E−03 | 4.5318E−03 | 0 | 0 |
| S7 | −1.1967E−03 | 7.5596E−05 | 0 | 0 |
| S8 | −7.6647E−03 | 7.7675E−04 | 0 | 0 |
| S9 | 4.0768E−04 | −1.0561E−05 | 0 | 0 |
| S10 | 1.7479E−04 | 3.0156E−05 | 0 | 0 |

Figure 22:
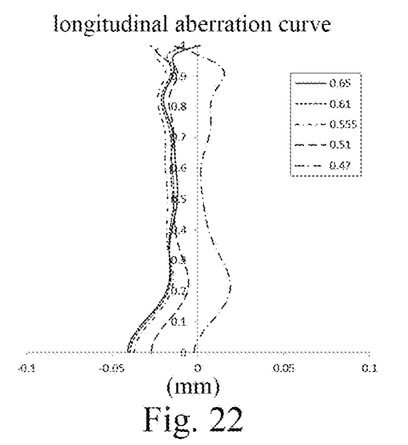
FIGS. 22-25 respectively illustrate a longitudinal aberration curve, an astigmatic curve, a distortion curve, and a lateral color curve of the imaging lens assembly according to Embodiment 5.
Figure 23:
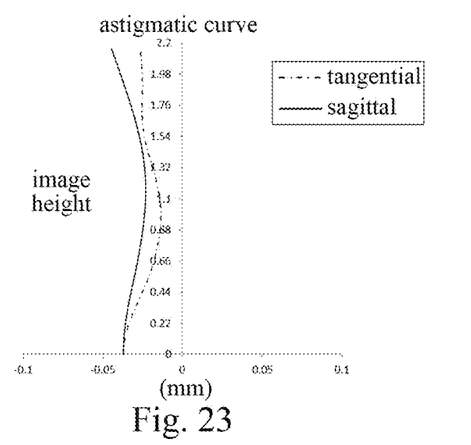
Figure 24:
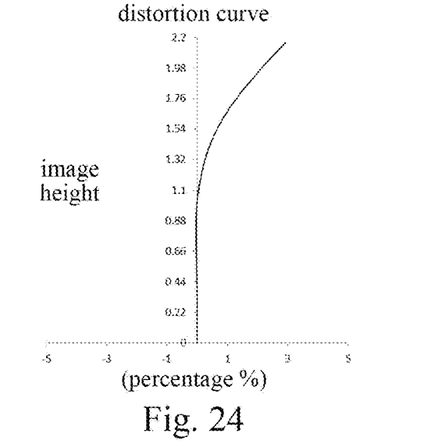
Figure 25:
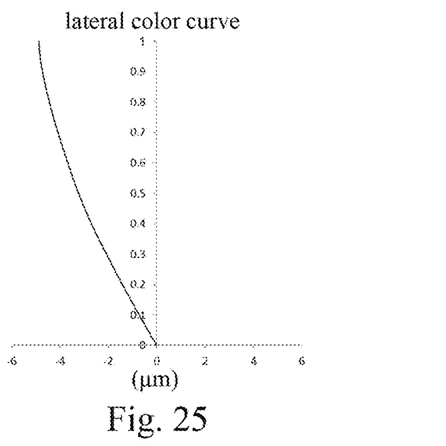

FIG. 22 illustrates the longitudinal aberration curve of the imaging lens assembly according to Embodiment 5, representing deviations of focal points of light of different wavelengths converged after passing through the optical system. FIG. 23 illustrates the astigmatic curve of the imaging lens assembly according to Embodiment 5, representing a curvature of the tangential image plane and a curvature of the sagittal image plane. FIG. 24 illustrates the distortion curve of the imaging lens assembly according to Embodiment 5, representing amounts of distortion at different viewing angles. FIG. 25 illustrates the lateral color curve of the imaging lens assembly according to Embodiment 5, representing deviations of different image heights on the image plane after light passes through the imaging lens assembly. In summary, it can be seen from FIGS. 22-25 that the imaging lens assembly according to Embodiment 5 is an imaging lens assembly including a glass lens and having an improved imaging performance.

Figure 26:
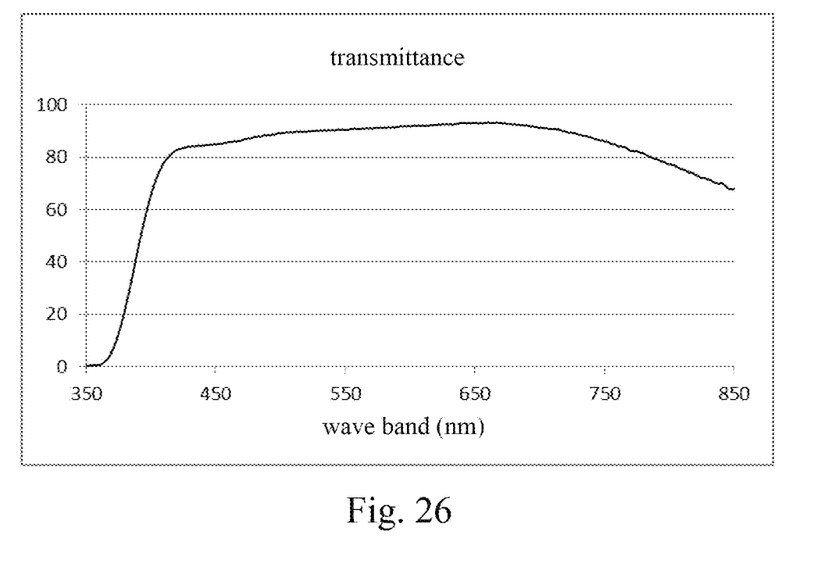
FIG. 26 illustrates transmittances of the imaging lens assembly according to the embodiments of the present disclosure corresponding to various wave bands.

FIG. 26 illustrates transmittances of the imaging lens assembly according to the embodiments of the present disclosure corresponding to various wave bands. As shown in the drawing, the transmittance T1 of the imaging lens assembly corresponding to the wave band 650 nm satisfies: T1>85%. The transmittance T2 of the imaging lens assembly corresponding to the wave band 490 nm satisfies: T2>88%. The transmittance T3 of the imaging lens assembly corresponding to the wave band 430 nm satisfies: T3>75%.

To sum up, the conditional expressions in Embodiments 1-5 respectively satisfy the relationships shown in Table 16 below.

TABLE 16

| | Embodiment | | | | |
|---|---|---|---|---|---|
| Conditional Expression | 1 | 2 | 3 | 4 | 5 |
| \|dng/dt\|/\|dni/dt\| | 0.06 | 0.03 | 0.05 | 0.05 | 0.03 |
| Vg/Vi | 1.46 | 0.37 | 0.95 | 0.95 | 0.55 |
| Ng | 1.50 | 1.92 | 1.69 | 1.69 | 1.68 |
| f/EPD | 1.68 | 1.68 | 1.69 | 1.69 | 2.28 |
| f/fg | 1.05 | −0.52 | 0.94 | 0.22 | 0.86 |
| f/R1 | 2.45 | 2.38 | 2.35 | 2.52 | 3.85 |
| R1/R4 | 0.77 | 0.84 | 0.91 | 0.71 | 0.43 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An imaging lens assembly, consisting of a first lens, a second lens, a third lens, a fourth lens, a fifth lens, and a sixth lens sequentially from an object side to an image side of the imaging lens assembly,
   wherein the first lens has a positive refractive power and a convex object-side surface;
   the second lens has a negative refractive power and a concave image-side surface;
   the fourth lens has a positive refractive power, a concave object-side surface and a convex image-side surface;
   the sixth lens has a convex object-side surface;
   wherein at least one of the first lens, the second lens, or at least one of the third lens, the fourth lens, the fifth lens or the sixth lens is a glass aspheric lens,
   wherein a transmittance T1 of the imaging lens assembly corresponding to a wave band 650 nm satisfies: T1>85%,
   a transmittance T2 of the imaging lens assembly corresponding to a wave band 490 nm satisfies: T2>88%, and
   a transmittance T3 of the imaging lens assembly corresponding to a wave band 430 nm satisfies: T3>75%,
   wherein an effective focal length f of the imaging lens assembly and an entrance pupil diameter EPD of the imaging lens assembly satisfy: 1.5<f/EPD≤1.69,
   wherein an abbe number Vg of the glass aspheric lens and an abbe number Vi of a lens closest to the image side satisfy: 0.35<Vg/Vi<1.5; and
   wherein the radius of curvature R1 of the object-side surface of the first lens and a radius of curvature R4 of the image-side surface of the second lens satisfy: 0<R1/R4≤0.84.

2. The imaging lens assembly according to claim 1, wherein an influence ratio dng/dt of a unit temperature to a unit refractive index of the glass aspheric lens and an influence ratio dni/dt of a unit temperature to a unit refractive index of a lens closest to the image side satisfy: |dng/dt|/|dni/dt|<0.1.

3. The imaging lens assembly according to claim 1, wherein a refractive index Ng of the glass aspheric lens satisfies: 1.5≤Ng≤2.0.

4. The imaging lens assembly according to claim 1, wherein the effective focal length f of the imaging lens assembly and an effective focal length fg of the glass aspheric lens satisfy: −0.6<f/fg<1.2.

5. The imaging lens assembly according to claim 1, wherein an effective focal length f of the imaging lens assembly and a radius of curvature R1 of the object-side surface of the first lens satisfy: 2<f/R1<4.

6. An imaging lens assembly consisting of a first lens, a second lens, a third lens, a fourth lens, a fifth lens, and a sixth lens sequentially from an object side to an image side of the imaging lens assembly,
wherein the fourth lens has a positive refractive power, a concave object-side surface and a convex image-side surface,
the sixth lens has a convex object-side surface;
wherein at least one of the first lens, the second lens, the third lens, the fourth lens, the fifth lens, or the sixth lens is a glass aspheric lens, and an influence ratio dng/dt of a unit temperature to a unit refractive index of the glass aspheric lens and an influence ratio dni/dt of a unit temperature to a unit refractive index of a lens closest to the image side satisfy: |dng/dt|/|dni/dt|<0.1,
wherein an effective focal length f of the imaging lens assembly and an entrance pupil diameter EPD of the imaging lens assembly satisfy: 1.5<f/EPD≤1.69,
wherein an abbe number Vg of the glass aspheric lens and an abbe number Vi of the lens closest to the image side satisfy: 0.35<Vg/Vi<1.5; and
wherein the radius of curvature R1 of the object-side surface of the first lens and a radius of curvature R4 of the image-side surface of the second lens satisfy: 0<R1/R4≤0.84.

7. The imaging lens assembly according to claim 6, wherein the first lens has a positive refractive power, an object-side surface of the first lens is a convex surface, the second lens has a negative refractive power, and an image-side surface of the second lens is a concave surface.

8. The imaging lens assembly according to claim 7, wherein the effective focal length f of the imaging lens assembly and a radius of curvature R1 of the object-side surface of the first lens satisfy: 2<f/R1<4.

9. The imaging lens assembly according to claim 6, wherein a transmittance T1 of the imaging lens assembly corresponding to a wave band 650 nm satisfies: T1>85%, a transmittance T2 of the imaging lens assembly corresponding to a wave band 490 nm satisfies: T2>88%, and a transmittance T3 of the imaging lens assembly corresponding to a wave band 430 nm satisfies: T3>75%.

10. The imaging lens assembly according to claim 6, wherein a refractive index Ng of the glass aspheric lens satisfies: 1.5≤Ng≤2.0.

11. The imaging lens assembly according to claim 6, wherein the effective focal length f of the imaging lens assembly and an effective focal length fg of the glass aspheric lens satisfy: −0.6<f/fg<1.2.

12. An imaging lens assembly, consisting of a first lens, a second lens, a third lens, a fourth lens, a fifth lens, and a sixth lens sequentially from an object side to an image side of the imaging lens assembly,
wherein the first lens has a positive refractive power and a convex object-side surface;
the second lens has a negative refractive power and a concave image-side surface;
the fourth lens has a positive refractive power, a concave object-side surface and a convex image-side surface;
the sixth lens has a convex object-side surface;
wherein at least one of the first lens, the second lens, or at least one of the third lens, the fourth lens, the fifth lens, or the sixth lens is a glass aspheric lens, and
an effective focal length f of the imaging lens assembly and a radius of curvature R1 of the object-side surface of the first lens satisfy: 2<f/R1<4,
wherein an effective focal length f of the imaging lens assembly and an entrance pupil diameter EPD of the imaging lens assembly satisfy: 1.5<f/EPD≤1.69,
wherein an abbe number Vg of the glass aspheric lens and an abbe number Vi of a lens closest to the image side satisfy: 0.35<Vg/Vi<1.5; and
wherein the radius of curvature R1 of the object-side surface of the first lens and a radius of curvature R4 of the image-side surface of the second lens satisfy: 0<R1/R4≤0.84.

13. The imaging lens assembly according to claim 12, wherein a transmittance T1 of the imaging lens assembly corresponding to a wave band 650 nm satisfies: T1>85%, a transmittance T2 of the imaging lens assembly corresponding to a wave band 490 nm satisfies: T2>88%, and a transmittance T3 of the imaging lens assembly corresponding to a wave band 430 nm satisfies: T3>75%.

\* \* \* \* \*